United States Patent Office 2,957,806
Patented Oct. 25, 1960

2,957,806

PROCESS FOR RAISING BLOOD SERUM IRON LEVELS AND CONTROLLING ANEMIA

Walter Rummel, Homburg, Saar, Germany, assignor to Dr. Schwarz Arzneimittelfabrik G.m.b.H., Dusseldorf, Germany, a corporation of Germany No Drawing. Filed Jan. 6, 1959, Ser. No. 785,133

8 Claims. (Cl. 167—68)

The present invention relates to a process for raising blood serum iron levels and controlling anemia.

This application is a continuation-in-part of copending application Serial No. 557,838 entitled "Therapeutic Iron Complex," filed January 9, 1956, now Patent No. 2,877,253.

When iron preparations are employed to replenish the body stores of iron it is necessary that they be administered in forms which are readily absorbable and well tolerated. Oral iron preparations are known to be much better absorbed as ferrous compounds (bivalent) than as ferric compounds (trivalent). In addition, they are better tolerated.

Ferrous compounds have the limitation that they tend to oxidize rather readily, especially in alkaline environment, thus being converted to the less desirable ferric form. It is usual practice to attempt to counteract this tendency by adding reducing agents. However, many of the best reducing agents are toxic and those that are usable for pharmaceutical purposes may deteriorate rather rapidly during production and storage. The result is that by the time a preparation including such an agent reaches the patient a significant proportion of the ferrous compound may have been converted into the corresponding undesirable ferric form. Hence it is a principal purpose of the present invention to provide a process of raising blood serum iron levels and treating iron deficiency anemia by the administration of ferrous sulfate-glycine complex which contains the ferrous ion in readily absorbable form but which nevertheless is stable over a wide range of conditions and particularly those found in the gastrointestinal tract.

The above and other objects are achieved by the oral administration of ferrous sulfate-glycine complex, preferably in the form of a coated pill containing a quantity of the complex which corresponds to 40 mgs. of ferrous iron, or in the form of a liquid each ccm. of which contains 30 mgs. of ferrous iron.

Ferrous sulfate-glycine complex is made in accordance with the teachings of the co-pending application Serial No. 557,838 and is more fully characterized in said application. For the purpose here, it is sufficient to describe the complex as the reaction product in an inert environment of ferrous sulfate and glycine, the same being substantially free of iron in the ferric form.

A preferred method of manufacturing the said ferrous sulfate-glycine complex is as follows: 10.0 g. of ferrous sulfate and 2.7 g. of glycine are thoroughly mixed and carefully heated under nitrogen to 70° C.; reaction occurs rapidly, and the complex compound is obtained as soon as the color turns uniformly light-brown; after cooling to 20° C., 12.7 g. of ferrous sulfate-glycine complex are obtained, which contains 100 mg. $Fe^{II}$-ions per 0.63 g.; for identification of ferrous sulfate-glycine complex the usual methods can be applied.

The complex is also quite stable in comparison with other ferrous compounds, there being no noticeable conversion to ferric forms. Clinical experience with the complex has demonstrated that iron therefrom is rapidly and effectively absorbed.

It was not possible to anticipate from the literature which preceded the present development that the combination of ferrous sulfate and glycine would yield iron in such readily absorbable form since such literature taught that iron would combine with amino acids to form insoluble, non-absorbable iron complexes. However, contrary to such teaching, it was found both clinically and in a number of experiments on the isolated intestine with radioactive iron that the present preparation not only is highly absorbable but that the complex provides an unusually stable form of ferrous ion and broadly protects said ion from conversion into non-absorbable compounds such as hydroxides and phytates which one might expect to find in the digestive tract.

Work with the ferrous sulfate-glycine complex has established that a good daily dosage is six tablets, i.e. a daily dosage of 240 mgs. of ferrous ion.

The efficacy of ferrous sulfate-glycine complex is strikingly demonstrated when its absorption, as indicated by blood serum iron concentration measurement is contrasted to that obtained with ferrous sulfate alone. Thus, in Table I, there is set forth a series of seven cases in which ferrous sulfate alone was administered in the dosage indicated, with the increased iron concentration shown.

Table I

| Administered dose of $Fe^{II}$ as a ferrous salt | | Increase of iron concentration in the serum in mcg. percent | |
|---|---|---|---|
| | | from— | to— |
| | Mg. | | |
| 1 | 120 | 99 | 109 |
| 2 | 120 | 85 | 108 |
| 3 | 120 $Fe^{II}$ | 114 | 135 |
| 4 | 120 | 68 | 106 |
| 5 | 240 | 25 | 126 |
| 6 | 240 | 42 | 55 |
| 7 | 240 | 102 | 126 |

Note that in spite of the fact that the starting iron concentration in blood serum in the case of most of the subjects described in Table I was extremely subnormal, nevertheless only a small portion of the iron administered was absorbed and incorporated in the serum. Contrast this with a set of observations made upon patients who received ferrous sulfate-glycine complex.

Table II

| Administered Dose of $Fe^{II}$ as a glycine complex | | Increase of iron concentration in the serum in mcg. percent | |
|---|---|---|---|
| | | from— | to— |
| | Mg. | | |
| 1 | 120 | 136 | 206 |
| 2 | 120 | 128 | 245 |
| 3 | 120 | 104 | 117 |
| 4 | 120 | 123 | 242 |
| 5 | 120 $Fe^{II}$ | 188 | 246 |
| 6 | 120 | 98 | 256 |
| 7 | 240 | 112 | 354 |
| 8 | 240 | 97 | 286 |
| 9 | 240 | 117 | 391 |
| 10 | 240 | 110 | 322 |

It is shown by Table II that despite the fact that the serum iron concentrations were substantially normal, a considerable portion of the ferrous ion administered was absorbed and incorporated in the blood serum. In addition to the good absorption and high stability properties of ferrous sulfate-glycine complex, it is found that unlike most iron preparations, the same does not have a constipating effect upon those to whom it is administered.

Comparative studies made with ferro sulfate, ferro gluconate and ferrous sulfate-glycine complex given to a group of confined fasting patients suffering from secondary anemia, in the course of which the test substances were administered in the form of coated pills each containing 40 mgs. of ferrous iron each and determinations of serum iron were made at the time of administration, three hours later and five hours later, resulted in a finding that in the case of each of the test substances serum iron concentration started to take place between 3 and 5 hours after ingestion of the pills and that the ferrous sulfate-glycine complex was absorbed more rapidly and obtained higher levels than either of the other test substances. In addition, the higher levels tended to be maintained for a longer period of time than the levels obtained by the other test substances. The finding of more rapid and more substantial absorbability adds another important advantage to the process of treatment described.

What is claimed is:

1. The method of raising iron concentration in blood serum which consists of orally administering the reaction product of ferrous sulfate and glycine substantially free of iron in the ferric form.

2. The method of raising iron concentration in blood serum which consists of introducing orally the light brown reaction product of ferrous sulfate and glycine heated in an inert environment substantially free of iron in the ferric form.

3. The method of raising iron concentration in blood serum which consists of orally administering ferrous sulfate-glycine complex substantially free of iron in the ferric form.

4. A process for controlling anemia which comprises administering ferrous sulfate-glycine complex substantially free of iron in the ferric form orally to a human.

5. The method of raising iron concentration in blood serum which consists of orally administering an effective amount of ferrous sulfate-glycine complex substantially free of iron in the ferric form.

6. A process for controlling anemia which comprises administering an effective amount of ferrous sulfate-glycine complex substantially free of iron in the ferric form orally to a human.

7. A method of raising iron concentration in blood serum which consists of orally administering unit dosages containing substantially a quantity of ferrous sulfate-glycine complex substantially free of iron in the ferric form which corresponds to 40 mgs. of ferrous iron in a solid pharmaceutical carrier.

8. A method of raising iron concentration in blood serum which consists of orally administering unit dosages containing substantially a quantity of ferrous sulfate glycine complex substantially free of iron in the ferric form, which corresponds to 30 mgs. of ferrous iron in a liquid pharmaceutical carrier.

References Cited in the file of this patent

U.S. Dispensatory, 25th ed., 1955, pp. 575–580.